United States Patent [19]

Dziki

[11] Patent Number: 4,621,748
[45] Date of Patent: Nov. 11, 1986

[54] THERMOPLASTIC BLOCK SHAPE, FEEDING MECHANISM AND MANUFACTURING METHOD

[75] Inventor: Michael M. Dziki, Woodbury, Minn.

[73] Assignee: Minnesota Mining and Manufacturing Company, St. Paul, Minn.

[21] Appl. No.: 664,044

[22] Filed: Oct. 23, 1984

Related U.S. Application Data

[63] Continuation of Ser. No. 456,346, Jan. 7, 1983, Pat. No. 4,552,287.

[51] Int. Cl.⁴ .................................... B67D 5/62
[52] U.S. Cl. .................... 222/146.5; 222/391; 74/128; 74/160; 74/169; 226/127; 226/167; 219/230
[58] Field of Search .............. 222/146.5, 391, 79; 226/127, 128–133, 142, 167; 219/230; 74/169, 160, 128

[56] References Cited

U.S. PATENT DOCUMENTS

| | | | |
|---|---|---|---|
| 2,732,101 | 1/1956 | Söhn | 74/169 X |
| 2,760,228 | 8/1956 | Verges | 18/13 |
| 2,995,159 | 8/1961 | Berggren | 141/82 |
| 3,204,828 | 9/1965 | Paulsen | 222/146 |
| 3,298,572 | 1/1967 | Newton | 222/146 |
| 3,337,093 | 8/1967 | Newton | 222/146.5 |
| 3,612,357 | 10/1971 | Ruskin | 222/146 |
| 3,917,123 | 11/1975 | Grenfell | 222/146 |
| 4,315,885 | 2/1982 | Lemelson | 264/297 |

Primary Examiner—Joseph J. Rolla
Assistant Examiner—Frederick R. Handren
Attorney, Agent, or Firm—Donald M. Sell; James A. Smith; William L. Huebsch

[57] ABSTRACT

A block of solid thermoplastic material comprising alternating sections of circular and rectangular cross section, a device for melting and dispensing thermoplastic material having a thumb operated drive assembly for driving the block into the device, and a molding mechanism including two chain like structures that move along linear path portions with molds included in the structures in face to face relationship while molten thermoplastic is injected in an inlet end of the linear path portion to continuously mold the block.

13 Claims, 19 Drawing Figures

THERMOPLASTIC BLOCK SHAPE, FEEDING MECHANISM AND MANUFACTURING METHOD

CROSS REFERENCE TO RELATED APPLICATION

This application is a continuation of U.S. patent application Ser. No. 456,346 filed Jan. 7, 1983, now U.S. Pat. No. 4,552,287 issued Nov. 12, 1985.

TECHNICAL FIELD

This application relates to devices for dispensing molten thermoplastic materials into which blocks of solid thermoplastic material are pressed by the thumb of the user's hand, shapes for blocks of solid thermoplastic material to be dispensed in such a device, and methods for making the blocks.

BACKGROUND OF THE INVENTION

Many devices are known for dispensing molten thermoplastic materials from blocks of solid thermoplastic material pressed into the device by the thumb of the user's hand, such as the prior art devices described in U.S. Pat. Nos. 3,204,828 and 3,298,572.

Generally, such devices comprise a barrel member having an internal melting chamber which communicates with an outlet opening through a nozzle, and a sleeve with a through opening having one end secured to the barrel member with its through opening communicating with the end of the melting chamber opposite the nozzle. The sleeve is adapted to receive an elongate cylindrical block of solid thermoplastic material which fits closely within the through opening in the sleeve, with one end portion of the block in the melting chamber and the other end portion projecting through the sleeve. Means are provided for heating the barrel member to melt the end portion of the block therein, and the device includes a handle positioned so that an operator can grip the handle with the fingers of one hand while pressing the block through the sleeve and into the melting chamber with the thumb of that hand to force molten thermoplastic material out of the melting chamber through the nozzle.

While such devices function effectively and provide great versatility in regulating the amount of thermoplastic material flowing through the devices, a problem can occur after the operator places a second block of thermoplastic material end to end with the block in the sleeve and presses on the outer end of the second block. The operator must hold the second block in place, thus occupying the operator's second hand which may be needed elsewhere such as to manipulate articles to which the molten thermoplastic material is being applied. If the operator does not hold the second block in place and releases the pressure on the second block as must be done to stop the flow of the molten thermoplastic material, or applies pressure in some direction other than axially along the second block before its leading end enters the sleeve, the second block can fall or fly away from the block already in the sleeve, which is inconvenient, distracting, and wasteful of the operator's time.

A device for dispensing molten thermoplastic material described in my U.S. Pat. No. 4,552,287, and incorporated herein by reference, provides, among other things, means for holding and properly positioning a second block of solid thermoplastic material at the end of a block of that material already in a sleeve and a melting barrel of a device of the type described above, even before the second block enters the outer end of the sleeve, thereby freeing the use of the operator's second hand for other activities.

That device, however, will hold a maximum of less than three block of thermoplastic material, and thus frequent loading of the device is required if the device is used continuously.

My U.S. patent application Ser. No. 570,245, describes a magazine assembly for use with the device described in my U.S. Pat. No. 4,552,287. The magazine assembly provides means for holding and properly positioning a lowermost block of thermoplastic material in aligned end-to-end relationship with a block of thermoplastic material within the sleeve while affording use of the operator's thumb to press the lowermost block through the sleeve and into the melting chamber and holding a stack of blocks of thermoplastic material normally above the lowermost block. The stack of blocks can be caused to drop down to position the next lowermost block in alignment with the remainder of a block of thermoplastic material that has been pressed through the sleeve by reciprocal movement of a thumb operated slide which provides both a pusher for the lowermost block and a support for the stack of blocks above the lowermost blocks. While this magazine assembly can be easily operated and holds a relatively large amount of thermoplastic material, it is more bulky than may be desired and must be loaded with a plurality of relatively small thermoplastic blocks.

DISCLOSURE OF THE INVENTION

The present inventions provide a new novel shape for a block of solid thermoplastic material that can more easily be melted and dispensed through a dispensing device of the type described above than cylindrical blocks of thermoplastic, a feeding mechanism adapted for use on a dispensing device of the type described above that is operated by the thumb of a user's hand, cooperates with the new block shape and, while being very compact, allows very long blocks of the new shape to be easily fed into the dispensing device to minimize loading time, and a simple and efficient manufacturing device and method for manufacturing the new block.

According to the present invention there is provided a block of solid thermoplastic material comprising coaxial generally cylindrical portions of uniform predetermined axial and diametrical dimensions uniformly axially spaced along the block by portions having rectangular cross sections and diagonal dimensions about equal to the diametrical dimension of the cylindrical portions; and a novel feeding mechanism adapted for use on a device for dispensing molten thermoplastic material of the type comprising a frame including a handle positioned so that an operator can grip the handle with the fingers of one hand, a barrel member mounted on the frame and having an internal melting chamber communicating with an outlet opening through a nozzle, a sleeve with a through opening having one end secured to the barrel member with the through opening communicating with the end of the melting chamber opposite said outlet opening, the sleeve being adapted to receive the block of solid thermoplastic material with one end portion of the block in the melting chamber and the block projecting through the sleeve, and means for heating the barrel member to melt the end portion of the block therein. The feeding mechanism comprises wall means adapted to be attached to the frame at the end of the sleeve opposite the melting chamber, which wall means defines a passageway adapted to guide the solid thermoplastic material block in alignment with the through opening in the sleeve; and a slide having an upper surface positioned adjacent one side of the block, having a notch opening through its side opposite its upper surface adapted to receive the end portion of an operator's thumb, and being mounted on the frame for movement along a path generally aligned with the melting chamber from a retracted position spaced from the sleeve to an advanced position more closely adjacent the sleeve and back to its retracted position. The notch is accessible by the thumb of an operator gripping the handle portion to afford manual reciprocation of the slide between its retracted and advanced positions by the operator. Drive means are carried by the slide and are adapted to engage the cylindrical portions and advance the block of thermoplastic material toward the melting chamber during movement of the slide from its retracted to its advanced position, and to move around the cylindrical portions and along the block of thermoplastic during movement of the slide from its advanced to its retracted position. Means are also provided for aligning the block of thermoplastic in the passageway for proper engagement by the drive means.

Such a feeding mechanism while being very compact, affords feeding the novel shaped blocks of thermoplastic having the novel shape described above that can have a significantly greater length than commercially available cylindrical blocks (e.g. from two inches to over twelve feet long) so that time lost loading the device is minimized.

Thermoplastic blocks of the shape described above are quite flexible compared to cylindrical blocks so that they can be coiled for storage (e.g., in 50 centimeter diameter coils). Also, it requires less force to feed thermoplastic blocks of the new shape into the device than it does to feed cylindrical blocks of thermoplastic into the device for the same output of melted thermoplastic material; apparently because the cavities around the periphery of the block between its cylindrical portions provide receptacles for melted thermoplastic material and allow the solid thermoplastic material to be pressed more directly into contact with the heated barrel member.

Thermoplastic blocks of the new shape may be easily formed in a mechanism comprising two chain like structures each comprising a plurality of pivotably interconnected block like molds, which when face to face define a cavity having the shape of the block therebetween, means for moving each of the chain like structures around a separate path with some blocks along the chain like structures moving in face to face contact along a linear path portion, and means for injecting molten thermoplastic material into one end of the cavity defined between the molds along the linear path portion. Also a mechanism can be provided for cutting the block into predetermined lengths as it emerges from the molds.

BRIEF DESCRIPTION OF THE DRAWING

The present invention will be further described with reference to the accompanying drawing wherein like reference numerals refer to like parts in the several views, and wherein.

THE DESCRIPTION OF THE PREFERRED EMBODIMENT

Referring now to the drawing there is shown in FIGS. 1 through 5 a dispensing device for molten thermoplastic material generally designated by the reference numeral 10, which device 10 is described using the same reference numerals from column 2, line 55 to column 8, line 4 of my U.S. Pat. No. 4,552,287 incorporated herein by reference.

Figure 1:
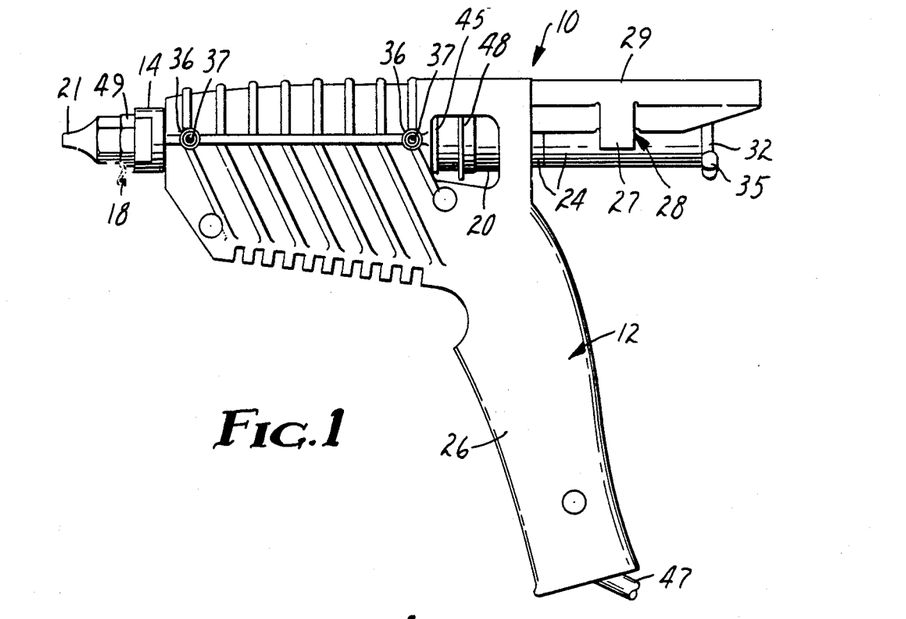
FIG. 1 is a side view of a first embodiment of a dispensing device described in my U.S. Pat. No. 4,552,287.
Figure 2:
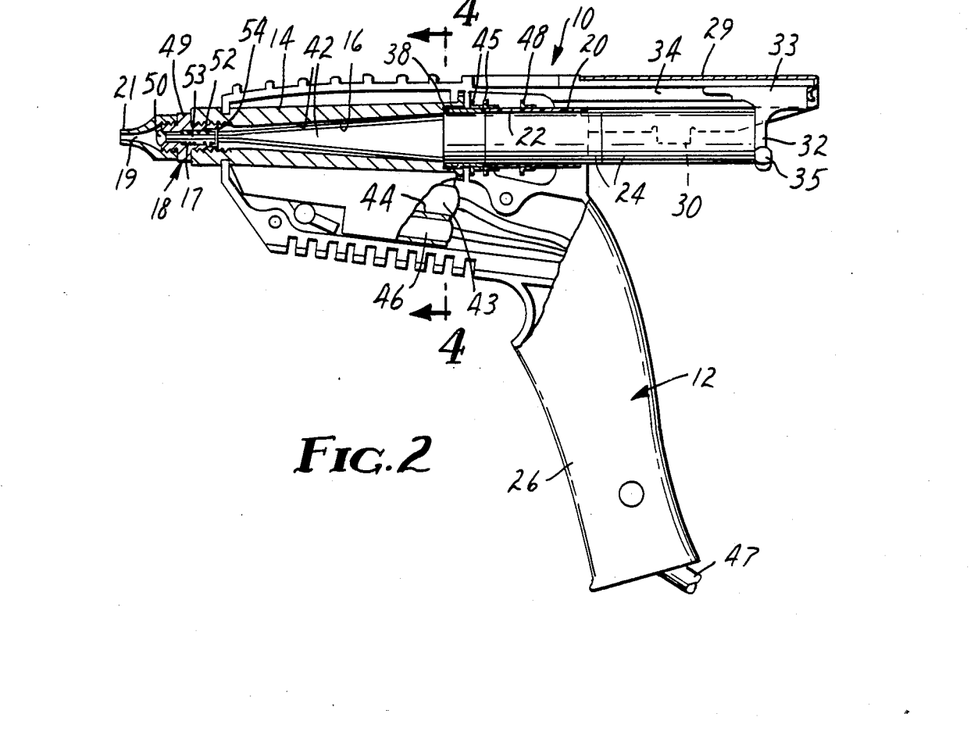
FIG. 2 is a side view of the dispensing device of FIG. 1 having parts broken away to show details.
Figure 3:
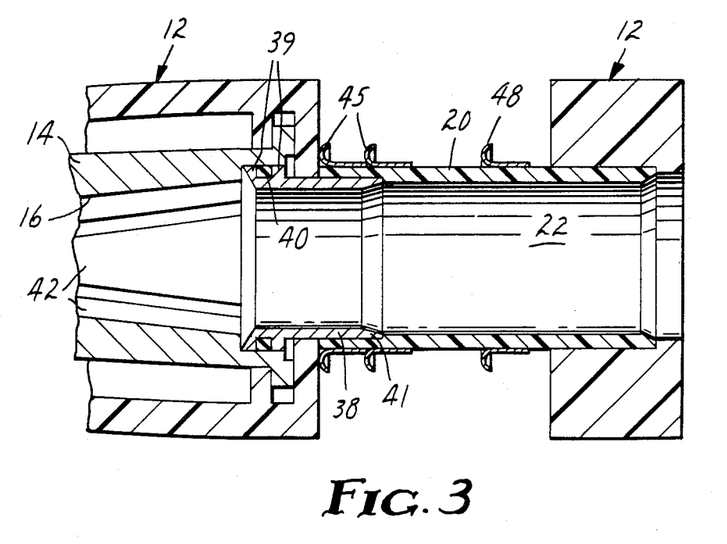
FIG. 3 is an enlarged fragmentary sectional view of a barrel member, a sleeve, and a barrier ring therebetween in the dispensing device of FIG. 1.
Figures 4, 5:
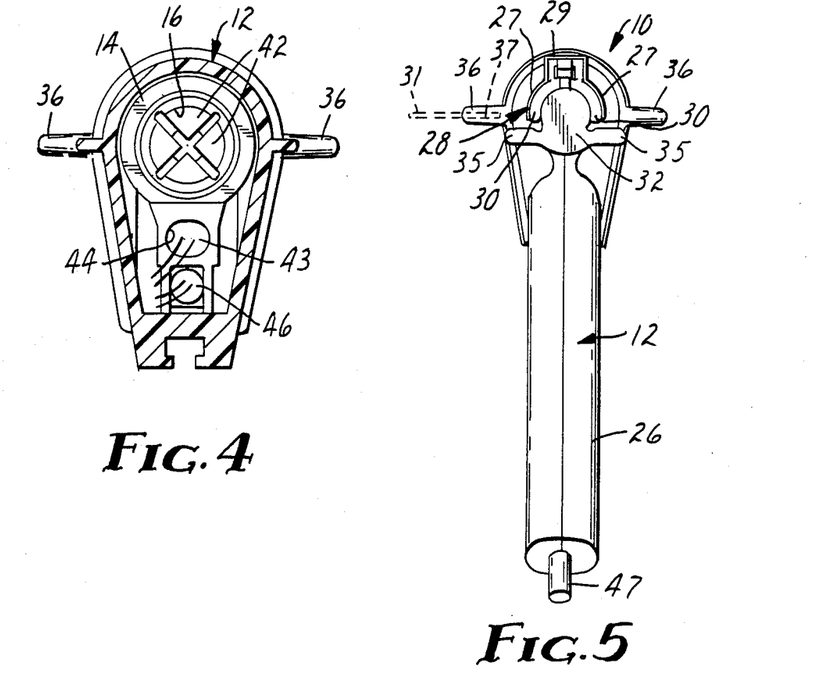
FIG. 4 is an enlarged sectional view taken approximately along lines 4—4 of FIG. 2.
FIG. 5 is an end view of the dispensing device of FIG. 1.
Figure 6:
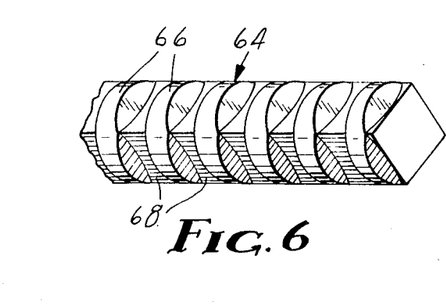
FIG. 6 is a perspective view of a block of solid thermoplastic material having a shape according to the present invention.

Referring now to FIGS. 7 through 10 of the drawing there is shown a dispensing device 60 for molten thermoplastic material according to the present invention, which device 60 has the same structure as the device 10 except that the channel 29 and pressure plate 32 of the device 10 have been replaced by a manually operated feeding assembly 62, which assembly 62 is adapted a feed a block 64 of solid thermoplastic material having the shape best illustrated in FIG. 6. Parts of the device 60 that have the same structures as parts of the device 10 have been given the same reference numerals to which have been added the suffix "a".

The block 64 of solid thermoplastic material (FIG. 6) comprises a plurality of coaxial generally cylindrical portions 66 with uniform predetermined axial and diametrical dimensions (e.g., about 0.38 centimeter and 1.5 centimeter respectively), which generally cylindrical portions 66 are uniformly axially spaced along the block 64 by similarly sized and oriented portions 68 having rectangular cross sections (preferably square as illustrated) having uniform diagonal dimensions about equal to the diametrical dimensions of the cylindrical portions 66, having corners aligned with the peripheries of the cylindrical portion 66 and having axial dimensions that are substantially less than those of the cylindrical portion 66 (e.g., about 0.25 centimeter). These alternating cylindrical and rectangular portions 66 and 68 result in a block 64 with evenly spaced projecting arcuate parts of the cylindrical portions 66 projecting from each of four sides of the block 64 defined by the aligned peripheral surfaces of the rectangular portions 68. These projecting arcuate parts provide uniformly spaced opposed arcuate teeth along opposite sides of the block 64 with planar slug surface portion between roots of adjacent teeth, and these teeth or projecting parts of the cylindrical portion 66 are like teeth on a rack and allow the block 64 to be aligned and driven by the feeding assembly 62, as will be further explained below. The spaces between these projecting parts of the cylindrical portions 66 also provide receptacles for molten material to facilitate melting the block 64 within the device 60 as has previously been described.

Figures 7, 10:
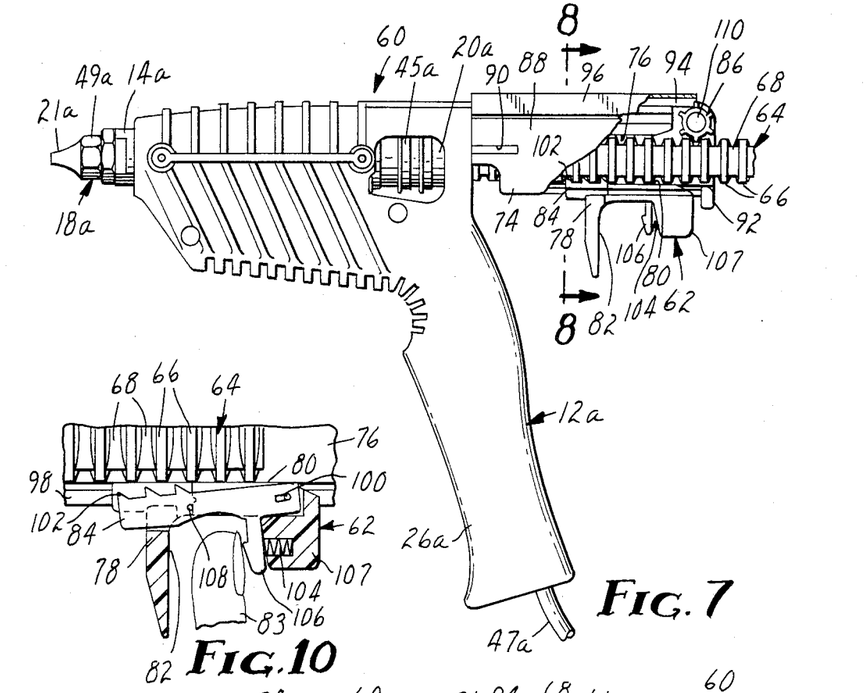
FIG. 7 is a side view of a dispensing device which is similar to the device of FIG. 1 except that it includes a different manually operable feeding mechanism according to the present invention for feeding blocks of solid thermoplastic material of the type shown in FIG. 6.
FIG. 10 is an enlarged fragmentary view of the slide and drive means shown in FIG. 9 being retracted along a block of solid thermoplastic material in the device.

Like the dispensing device 10, the device 60 comprises a two part frame 12a, a barrel member 14a mounted between the parts of the frame 12a and having an internal melting chamber communicating via a discharge passageway through a valve assembly 18a with an outlet opening through a nozzle 21a, and a sleeve 20a with a cylindrical through opening having one end secured to the barrel member 14a with its through opening communicating with the end of the melting chamber opposite the discharge passageway. The sleeve 20a is adapted to receive the block 64 of solid thermoplastic material within the cylindrical through opening with a slight clearance fit even when the diameter of the block 64 is at the large end of its tolerance range, with one end portion of the block 64 in the melting chamber and the block 64 projecting through the opening in the sleeve 20a. Means are provided in the device 60 for heating the barrel member to melt the end portion of the block 64 therein. The frame 12a includes a handle 26a positioned so that an operator can grip the handle 26a with the fingers of one hand while applying pressure with the thumb of that hand to press the block 64 through the sleeve 20a and into the melting chamber to force molten thermoplastic material out of the melting chamber through the valve assembly 18a and nozzle 21a.

Unlike the device 10, the device 60 includes the feeding assembly 62 at the end of the sleeve 20a opposite the barrel member 14a, which feeding assembly 62 includes means adapted for receiving and for holding the block 64 of solid thermoplastic material in the sleeve 20a, while affording the application of force by the thumb of an operator on the block 64 to press it into the sleeve 20a toward the melting chamber.

Figures 8, 9:
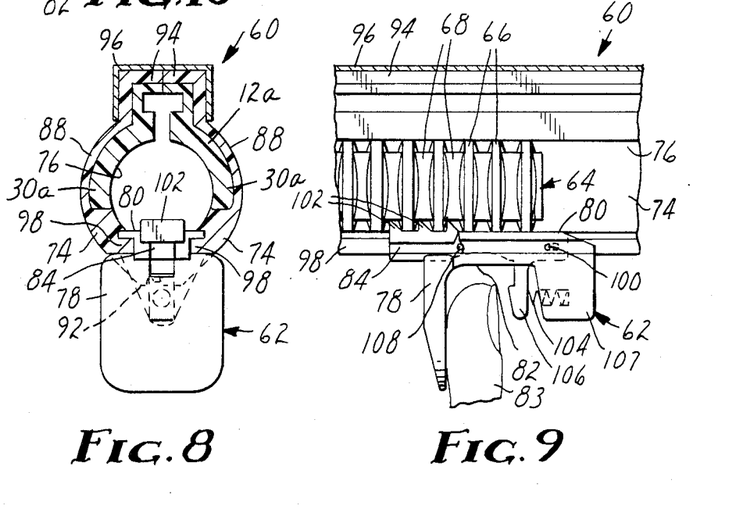
FIG. 8 is an enlarged sectional view taken approximately along line 8—8 of FIG. 7.
FIG. 9 is an enlarged fragmentary view of a slide and drive means in the dispensing device of FIG. 7 being used to press a block of solid thermoplastic material into the device.

As illustrated, the feeding assembly 62 comprises (1) wall means or walls 74 removably fixed to the frame 12a, that define a passageway 76 adapted to guide the solid thermoplastic material block 64 in alignment with the through opening in the sleeve 20a; (2) a slide 78 having a cylindrically concave upper surface 80 adapted to support the block 64, having projecting parts defining a recess 82 opening through its side opposite its upper surface 80 adapted to receive the end portion of an operator's thumb 83, and being mounted on the walls 74 for movement along a path generally aligned with the melting chamber from a retracted position spaced from the sleeve 20a to an advanced position more closely adjacent the sleeve 20a and back to its retracted position, the recess 82 being accessible by the thumb 83 of an operator gripping the handle 26a to afford manual reciprocation of the slide 78 between its retracted and advanced positions by the operator; (3) drive means comprising a drive member 84 pivotably mounted on the slide 78 adapted for engaging the cylindrical portions 66 of the block 64 of thermoplastic material and advancing the block 64 toward the melting chamber during movement of the slide 78 from its retracted to its advanced position, and for moving around the cylindrical portions 66 and along the block 64 of thermoplastic during movement of the slide 78 from its advanced to its retracted position; and (4) means comprising a sprocket wheel 86 rotatably mounted on the walls 74 for aligning the block 64 of thermoplastic in the passageway 76 for engagement by the drive member 84 and for providing friction to help retain the block 64 in the passageway 76 before it is engaged by the drive means.

The walls 74 that define the passageway 76 for receiving the block 64 in a position aligned with the through opening in the sleeve 20a each have generally arcuate opposed portions 88 (FIG. 8) relieved along their inner surfaces to receive the gripping parts 30a and the surrounding supporting structure of the frame 12a, and having through slots 90 (FIG. 7) at their ends adjacent the sleeve 20a that receive normally horizontal reinforcing webs on the frame 12a. The walls also include transverse end wall portions 92 (FIG. 7) at their ends opposite the sleeve 20a that interlock at their bottom edge, and longitudinally extending opposed contacting top wall portions 94 that are held together by a U-shaped spring metal channel 96 that fits around the top wall 94 portions to hold the walls 74 in place around the gripping parts 30a and adjacent portions of the frame 12a. The arcuate portions 88 of the walls 74 have inner surfaces that, with the inner surfaces of the gripping parts 30a, define the passageway 76 that has an inlet through the end wall portions 92.

The walls 74 also include opposed longitudinally extending spaced ledges 98 along their edges opposite the top wall portions 94, and the slide 78 has opposite longitudinally extending grooves to receive the ledges 98 to afford reciprocation of the slide 78 along the ledges 98 between its retracted and advanced positions.

The drive member 84 is elongate, has a plurality of or three teeth 102 adapted to engage between the cylindrical portions 66 of the block 64 projecting from one side adjacent a first end and is positioned in a groove in the slide 78 extending axially of the passageway 76 with its longitudinal direction generally parallel to the passageway 76 and the teeth 102 adjacent the sleeve 20a. The drive member 84 has its second end opposite its first end mounted on the slide 78 by a pivot pin 100 extending transverse to the passageway 76 for pivotal movement between (1) an engage position (FIG. 9) with the teeth 102 in engagement between the cylindrical portions 66 of a block 64 positioned in the passageway 76 (to which engage position the drive member 84 is biased by a coil spring 104 between projections 106 and 107 projecting respectively from the sides of the drive member 84 and slide 78 opposite the passageway 76) and (2) a release position (FIG. 10) with the teeth 102 spaced from the block 64 in the passageway 76 (toward which release position the drive member 84 can be pivoted by camming movement of the inclined rear surface of the teeth 102 over the cylindrical portions 66 of the block 64 and/or engagement of an operator's thumb with the projection 106 to move the slide 78 toward its retracted position).

Additionally means are provided for restricting pivotal movement of the drive member 84 from its engage to its release position when an operator applies force to the slide 78 to move it towards its advanced position. The opening through the drive member 84 in which the pivot pin 100 is received is elongate in a direction parallel to the passageway 76 so that, in its engage position, the drive member 84 can move axially of the passageway 76 and longitudinally with respect to the slide 78 on which it is mounted between (1) a normal position to which it is biased by the spring 104 and from which it can be pivoted to its release position due to separation between a lock pin 108 through the drive member 84 and the slide 78 (FIG. 10), and (2) a locked position (FIG. 9) with the lock pin 108 engaged in a transverse groove along a forward facing surface on the slide 78, to which locked position the drive member 84 will be moved against the bias of the spring 104 by a force transferred from the slide 78 to the drive member 84 to press the block 64 into the sleeve 20a.

The sprocket wheel 86, which provides means for aligning the block 64 of thermoplastic in the passageway 76 for engagement by the teeth of the drive member 84 and for providing sufficient friction to retain the block 64 in the passageway 76 before it is engaged by the drive member 84, is rotatably mounted on a pin 110 extending transverse of the passageway 76 on the side of the passageway opposite the drive member 84 and adjacent the inlet of the passageway 76. The sprocket has a plurality of teeth with axially extending parallel tips spaced to engage between the projecting parts of the cylindrical portions 66 and engage the corresponding planar surfaces of the rectangular portions 68 therebetween to orient those contacted planar surfaces parallel to the teeth and axis of the sprocket 86, and to thereby orient the opposite corresponding planar surfaces of the rectangular portions 68 parallel to the teeth 102 on the drive member 84.

To use the dispensing device 60, an operator first connects its power cord 47a to a source of electrical power so that its barrel member 14a and barrier ring are heated by its heating element. After insuring the slide 78 is in its retracted position, the operator inserts one end of the block 64 of thermoplastic material into the open inlet end of the feeding assembly 62 which orients the block 64 in the passageway 76 by engagement of the teeth on the sprocket wheel 86 along corresponding sides of its rectangular portions 68. He then grabs the handle 26a with one hand, engages the thumb of that hand in the recess 82 in the slide 78 and uses his thumb to move the slide 78 so that the teeth 102 on the drive assembly engage between the cylindrical portions 66 on the block 64 to press the block 64 toward the sleeve 20a and into the melting chamber in the barrel member 14a where the end portion of the block 64 will be made molten by contact with the inner surface of the barrel member 14a. As the slide 78 is thus moved from its retracted position toward its advanced position, the force applied through the drive member 84 will allow the drive member 84 to slide longitudinally against the bias of the spring 104, causing the lock pin 108 to engage the transverse slot in the leading surface of the slide 78 and thereby preventing the drive member 84 from moving toward its release position.

After the slide 78 is thus moved fully to its advance position, the operator can manually retract the slide 78 along the periphery of the block 64 by engagement of his thumb against the projection 106 on the drive member 84 which projects into the recess 82 in the slide 78, which engagement will cause the drive member 84 to move relative to the slide 78, the lock pin 108 to move out of the groove in the slide 78, and the drive member 84 to pivot so that the teeth 102 move out of engagement with and along the periphery of the block 64 in the passageway 76; whereupon the operator can again manipulate the slide 78 with his thumb to engage the teeth 102 with a new portion of the block 64 and continue pressing it into the sleeve 20a and the melting chamber. Preferably the teeth 102 have leading edges that are disposed at about 89 degrees with respect to the longitudinal direction of the drive member 84 to help the teeth 102 release from the block 64.

Referring now to FIGS. 11 through 16 there is illustrated a method and device 120 according to the present invention for making the block 64 of thermoplastic material shown in FIG. 6.

As illustrated, the device 120 comprises first and second chain-like structures 122 and 123, each comprising a plurality of block shaped molds 124. Each of the molds 124 (FIGS. 15 and 16) has parallel end surfaces 125, a side surface or face 126 disposed at a right angle with respect to its end surfaces 125, and an elongate centrally located cavity 128 opening through its face 126 and end surfaces 125. The cavity 128 has the shape of one half of the block 64 divided along a plane through its axis and two opposite corners of each of its rectangular portions 68. The molds 124 in the first chain like structure 122 are attached together close to their end surfaces 125 by flanking circular pivot plates 130 pivotably connected to the molds 124 by shoulder bolts 131; and the molds 124 in the second chain like structure 123 are attached together close to their end surfaces 125 by flanking semicircular pivot plates 132 pivotably connected to the molds 124 by shoulder bolts 133. The pivot plates 132 have semicircular recesses 134 in their sides adjacent the faces 126 of the molds 124 which will receive portions of the circular pivot plates 130 and allow adjacent molds 124 between the chain like structures 122 and 123 to be longitudinally registered in face 126 to face 126 contact with the mold cavities 128 aligned between the faces 126 of the molds 124 and with the end surfaces 125 of adjacent molds 124 along each of the chain like structures 122 and 123 in contact with the ends of the cavities 125 opening through the end surfaces 125 aligned between adjacent molds 124.

Figure 11:
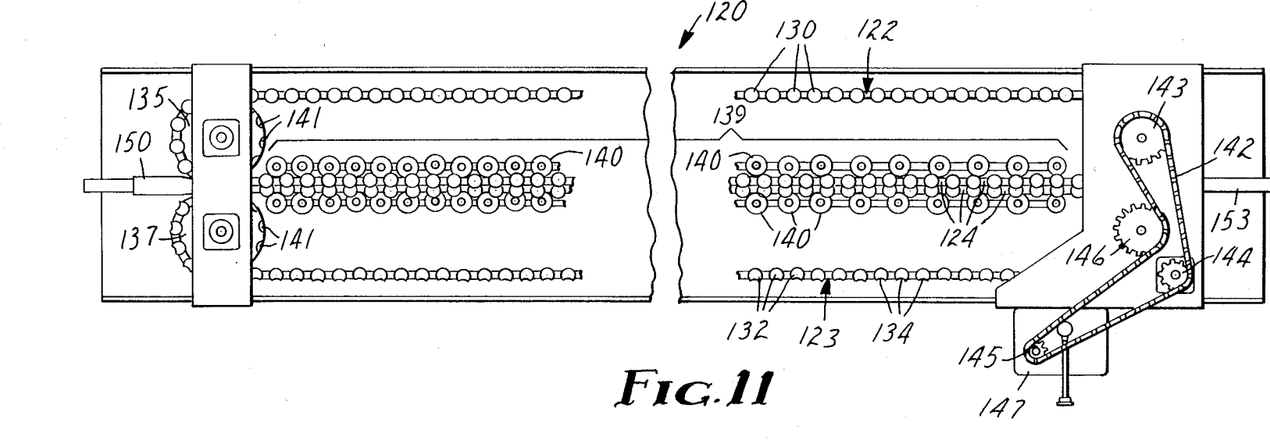
FIG. 11 is a fragmentary plan view of a mechanism according to the present invention for making blocks of thermoplastic material having the shape of the block shown in FIG. 6.
Figure 12:
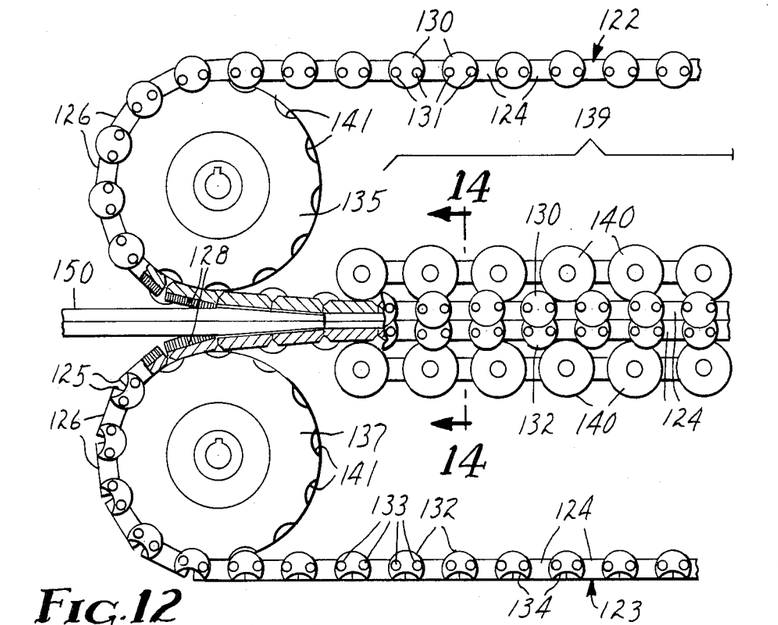
FIGS. 12 and 13 are enlarged fragmentary views of inlet and outlet ends respectively of the mechanism shown in FIG. 11, which mechanism has parts broken away and removed to show details.
Figure 13:
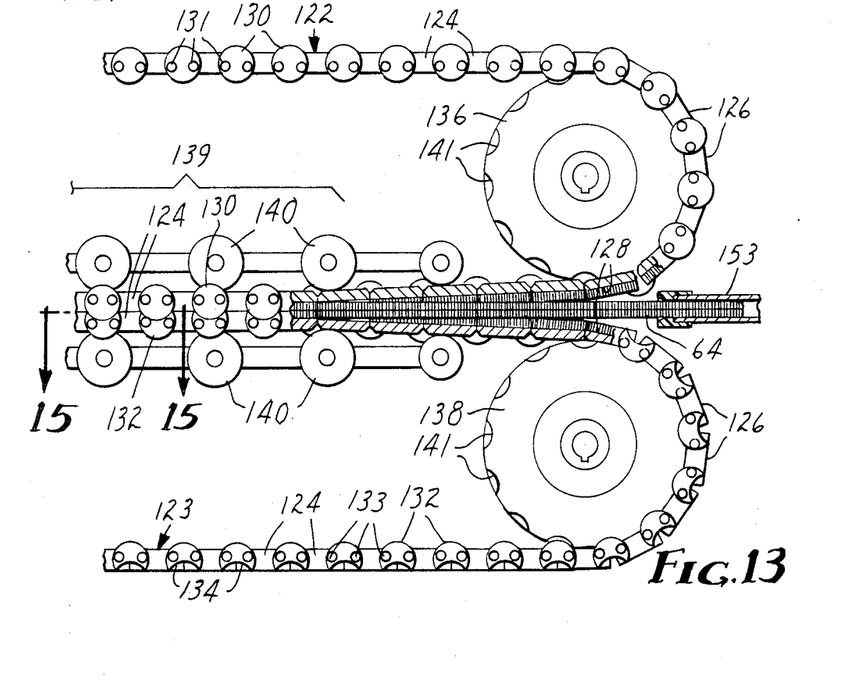
Figure 14:
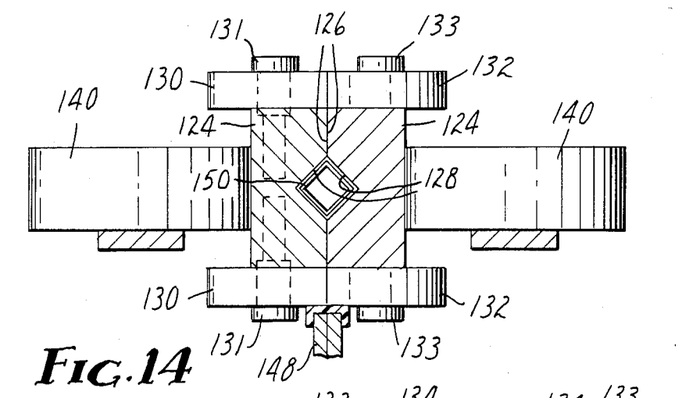
FIG. 14 is an enlarged fragmentary sectional view taken approximately along line 14—14 of FIG. 12.
Figure 15:
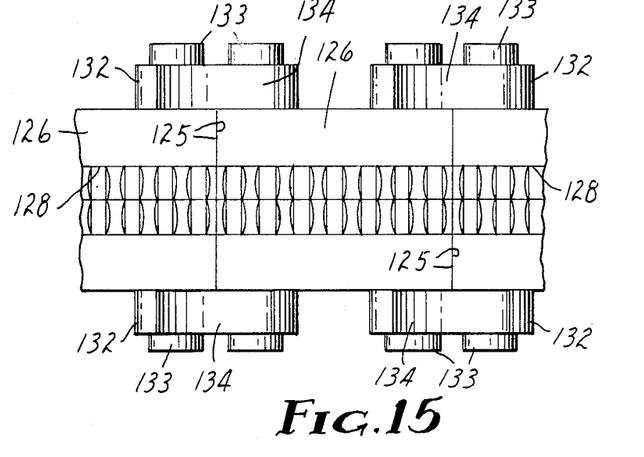
FIG. 15 is an enlarged fragmentary sectional view taken approximately along line 15—15 of FIG. 13.
Figure 16:
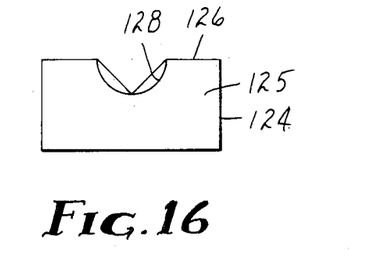
FIG. 16 is an end detail view of one of a plurality of molds included in the mechanism shown in FIGS. 11 through 16.

The two chain like structures 122 and 123 are disposed around and extend between pairs of sprockets 135, 136 and 137, 138 respectively each rotatable about a vertical axis, with each pair of sprockets 135, 136 and 137, 138 spaced and positioned to allow adjacent lengths of the chain like structures 122 and 123 to move along a linear path portion 139 with the molds 124 in face 126 to face 126 contact and slideably supported along their lower surface by a support 148 (FIG. 14). Along that linear path portion 139 the molds 124 will be maintained in face 126 to face 126 contact by two rows of rollers 140 that are spaced to engage the surfaces of the molds 124 opposite their faces 126. The sprockets 135, 136, 137, and 138 have semicircular notches 141 shaped to closely receive circular portions of the pivot plates 130 or 132 to both help keep the chain like structures 122 and 123 in synchronism, and to drive the chain like structures 122 and 123 via a roller chain 142, sprockets 143, 144, 145 and 146 and a gear reduced variable speed drive unit 147 as is shown in FIG. 11. The sprockets 135 and 137 are spaced apart and spaced from the inlet end of the linear path portion 139 defined by the rollers 140 (FIG. 12) so that the faces 126 of the molds 124 are spaced apart at the nip of the sprockets 135 and 137 (e.g., about 2.5 centimeter) and the molds 124 move along generally parallel but converging path portions for a short distance (e.g., about 18 centimeters) between the peripheries of the sprockets 135 and 137 and the linear path portion 139; and the sprockets 136 and 138 are spaced apart and spaced from the outlet end of the linear path portion 139 so that the molds 124 move along a generally parallel but diverging path portion for a short distance (e.g., about 30 centimeters) from that outlet to the peripheries of the sprockets 136 and 138 (FIG. 13) where the faces 126 of the molds 124 are spaced apart (e.g., 3.8 centimeter). This allows the pivot plates 130 and 132 to move in proper alignment for engagement or disengagement of the circular plates 130 with the recesses 134 in the plates 132 in directions generally normal to the faces 126 of the molds 124 before or after the plates 130 and 132 engage along the linear path portion 139 as a result of contact by the rollers 140, which engagement or disengagement could not so easily occur if the blocks moved into and out of face 126 to face 126 contact at the peripheries of the sprockets 135, 137; 136, 138; and allows the molds 124 to separate sufficiently in a direction generally normal to the faces 126 to disengage the projecting parts of the cylindrical portions 66 of the newly formed block 64 of adhesive from the cavities 128 in the molds 124 before the molds 124 start to move away from each other around the sprockets 136 and 138.

Molten polymeric material is delivered through an elongate tube 150 from a source such as an extruder (not shown) into the cavity between the face 126 to face 126 molds 124 along the linear path portion 139, which tube 150 has a square periphery sized and oriented to just fit inside the cavity between the parts of the molds 124 that form the portions 68 with square cross square cross sections for the block 64 of thermoplastic material 64 (FIG. 14). The molten material cools and solidifies as the molds 124 move along the linear path portion 139, and the continuously molded block 64 of thermoplastic material is expelled from between the molds 124 as they separate and can be propelled through a guide tube 153 into a device 160 shown in FIGS. 17, 18 and 19 for cutting the continuously molded block 64 of adhesive into predetermined lengths.

Figure 17:
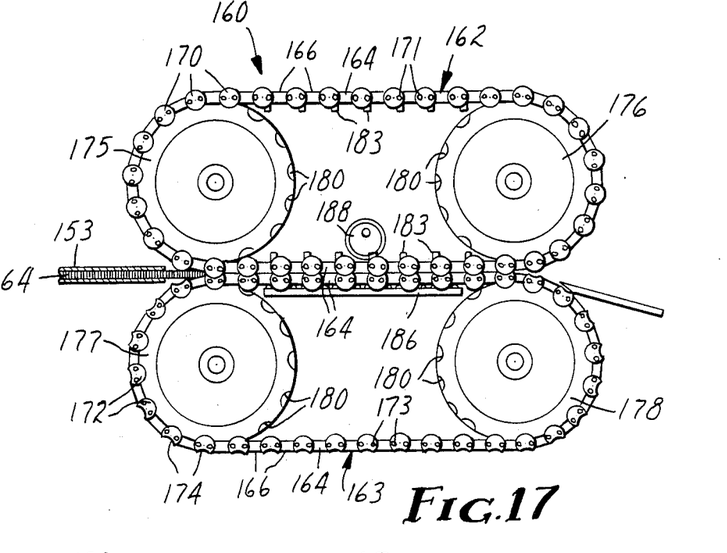
FIG. 17 is a plan view of a mechanism according to the present invention for cutting blocks of thermoplastic material made by the mechanism shown in FIGS. 11 through 16.
Figures 18, 19:
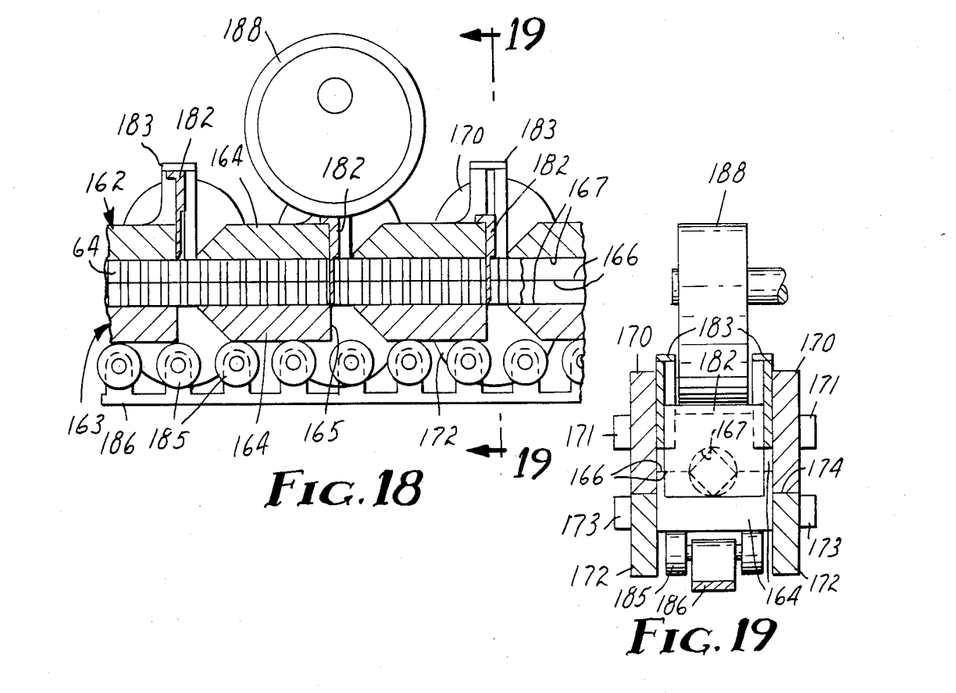
FIG. 18 is an enlarged fragmentary sectional view of the mechanism shown in FIG. 17.
FIG. 19 is a fragmentary sectional view taken approximately along line 19—19 of FIG. 18.

Referring now to FIGS. 17 through 19 there is illustrated a method and the device 160 according to the present invention for cutting the continuously molded block 64 of thermoplastic materials made by the device 120 into predetermined lengths.

As illustrated, the device 160 comprises first and second chain-like structures 162 and 163, each comprising a plurality of block shaped support members 164. Each of the support members 164 has end surfaces 165, a side surface or face 166 between its end surfaces 165, and an elongate centrally located semicylindrical recess 167 opening through its face 166 and end surfaces 165 adapted to receive one half of the block 64. The support members 164 in the first chain like structure 162 are attached together adjacent their end surfaces 165 by flanking circular pivot plates 170 pivotably connected to the support members 164 by shoulder bolts 171, and the support members 164 in the second chain like structure 163, are attached together adjacent their end surfaces 165 by flanking semicircular pivot plates 172 pivotably connected to the support members 164 by shoulder bolts 173. The pivot plates 172 have semicircular recesses 174 in their sides adjacent the faces 166 of the support members 164 which will receive portions of the circular pivot plates 170 and allow adjacent support members 164 between the chain like structures 162 and 163 to be longitudinally registered in faces 166 to face 166 contact with the recesses 167 aligned between the support members 164.

The two chain like structures 162 and 163 are disposed around and extend between pairs of sprockets 175, 176 and 177, 178 respectively, with each pair of sprockets 175, 176, and 177, 178 spaced and positioned to allow adjacent lengths of the chain like structures 162 and 163 between the pairs of sprockets 175, 176 and 177, 178 to move in face 166 to face 166 contact. The sprockets 175, 176, 177, and 178 have semicircular notches 180 shaped to closely receive circular portions of the pivot plates 170 or 172 to both help keep the chain like structures 162 and 163 in synchronism, and to drive the chain like structures 162 and 163 so that rotation of two of the sprockets 175, 177 or 176, 178 by a drive connection (not shown) powered by the drive unit 147 can drive the chain like structures 162 and 163 in synchronism with the chain like structures 122 and 123 of the device 120. Thus the pair of sprockets 175, 176 and 177, 178 provide means for moving each of the chain like structures 162 and 163 around a separate path with portions of the chain like structures 162 and 163 moving in face 166 to face 166 relationship along a linear cut off path portion from a beginning of the cut off path portion between the sprockets 175 and 177 positioned to receive the block 64 from the device 120 to an end of the linear cut off path portion between the sprockets 176 and 178 where severed pieces of the block 64 are expelled.

A plurality of knives 182 are mounted on the support members 164 of the first chain like member 162 between edge guides 183 fixed to those support members for movement in a direction transverse to the recess 174 between a retracted position spaced from the recess 174 and a severed portion extending across the recess 174 in support members 164 along the cut off path portion.

Means are provided for moving the knives 182 from their retracted positions to their engaged positions along the cut off path portion to cut the block 64 into predetermined lengths, and for returning the knives 182 to their retracted positions along a portion of the path spaced from said cut off path portion. The support members 164 on the second chain like structure 163 are supported on their sides opposite their recess 174 by a plurality of rollers 185 rotatably mounted on a frame members 186. A circular cam 188 is mounted for rotation about an axis parallel to and spaced from its axis and is driven by means (not shown) in an eccentric path so that it will engage and press each knife 182 from its retracted to its engaged position as the knife 182 moves past the cam 188 along the cut off portion of the path. Such movement will sever the block 64 which will be expelled from between the chain like structures 162 and 163 as they separate around the sprockets 176 and 178, and movement of the support members 164 carrying the knives 182 around the sprocket 176 will cause the knives 182 to return to their retracted positions under the influence of gravity as those support members 164 move along the portion of the path for the first chain like structure 162 spaced from the cut off path portion. Knives 182 may be removed from certain of the support members 164 as desired to provide blocks 64 of different predetermined lengths.

The present inventions have now been described with reference to single embodiments thereof. It will be apparent to those skilled in the art that many changes can be made in the embodiments described without departing from the scope of the present inventions. Thus the scope of the present invention should not be limited to the structures described in this application, but only by structures described by the language of the claim and their equivalents. For example, with some loss of flexibility a thermoplastic block useable in the device could have uniformly spaced opposed arcuate rock like teeth along only two opposite sides, with parallel planar slug surfaces between the roots of adjacent teeth.

I claim:

1. In combination, a block of solid thermoplastic material comprising coaxial generally cylindrical portions of uniform predetermined axial and diametrical dimensions uniformly axially spaced along the block by rectangular portions having diagonal dimensions about equal to said diametrical dimension; and a device for dispensing molten thermoplastic material from said block comprising a frame including a handle positioned so that an operator can grip the handle with the fingers of one hand, a barrel member mounted on said frame and having an internal melting chamber communicating with an outlet opening through a nozzle, a sleeve with a through opening having one end secured to said barrel member with said through opening communicating with the end of said melting chamber opposite said outlet opening, said sleeve being adapted to receive said block of solid thermoplastic material with one end portion of the block in the melting chamber and the block projecting through said sleeve, means for heating said barrel member to melt the end portion of the block therein, and a feeding mechanism at the end of said sleeve opposite said melting chamber comprising wall means fixed to said frame and defining a passageway adapted to guide the solid thermoplastic material block in alignment with the through opening in said sleeve, a slide having an upper surface positioned adjacent one side of the block, and being mounted on said frame for movement along a path generally aligned with the melting chamber from a retracted position spaced from said sleeve to an advanced position more closely adjacent the sleeve and back to said retracted position, drive means carried by said slide adapted for engaging said cylindrical portions and advancing the block of thermoplastic material toward the melting chamber during movement of said slide from its retracted to its advanced position, and for moving around the cylindrical portions and along the block of thermoplastic during movement of said slide from its advanced to its retracted position, means for aligning the block of thermoplastic in said passageway for engagement by said drive means, and means projecting from the side of said slide opposite said upper surface in a direction generally at a right angle to said upper surface including a first projecting part adjacent said sleeve and a second projecting part spaced from the side of said first projecting part opposite said sleeve for defining a recess between said first and second parts adapted to receive the end portion of the thumb of an operator gripping said handle to afford manual movement of said slide body toward said advanced position and toward said retracted position.

2. A combination according to claim 1 wherein said rectangular portions are square in cross section.

3. A combination according to claim 1 wherein said means for aligning comprises a sprocket having teeth spaced to engage between said cylindrical portions along corresponding sides of said rectangular portions, said sprocket being mounted on said wall means on the side of said passageway opposite said drive means for rotation about an axis disposed transverse of said passageway.

4. A combination according to claim 1 wherein said drive means comprises an elongate drive member having a plurality of teeth adapted to engage between the cylindrical portions of the block, said teeth projecting from one side of said drive member adjacent a first end of said drive member, said drive member being oriented on said slide with its longitudinal direction generally parallel to said passageway and said teeth adjacent said sleeve and having a second end opposite said first end mounted on said slide both for pivotal movement of said drive member relative to said slide between an engage position with said teeth in engagement between cylindrical portions of said block in said passageway and a release position with the teeth spaced from the block in the passageway, and for longitudinal movement relative to said slide between a normal position and a locked position with said teeth farther from said sleeve with respect to the same position of said slide when said drive member is in said normal position; means adapted for engagement between said slide and said drive member to prevent pivotal movement of said drive member away from said engage position when said drive member is in said locked position and to afford movement of said drive member from said engage position to said release position when said drive member is in said normal position, and a spring between said slide and said drive member for biasing said drive member to said normal and engage positions, said drive member having a projection projecting into said recess and manually engageable to pivot said drive member to said release position when said slide is manually moved toward said retracted position.

5. A combination according to claim 4 wherein said teeth have cam surfaces on their sides opposite said sleeve adapted to cam said teeth around said cylindrical portions of said block by pivoting said drive member toward said release position when said slide is manually moved from said advanced position toward said retracted position.

6. A device adapted for dispensing molten, thermoplastic material from a block of the solid thermoplastic material comprising coaxial generally cylindrical portions of uniform predetermined axial and diametrical dimensions uniformly axially spaced along the block by rectangular portions having diagonal dimensions about equal to said diametrical dimension, said device comprising a frame including a handle positioned so that an operator can grip the handle with the fingers of one hand; a barrel member mounted on said frame and having an internal melting chamber communicating with an outlet opening through a nozzle; a sleeve with a through opening having one end secured to said barrel member with said through opening communicating with the end of said melting chamber opposite said outlet opening, said sleeve being adapted to receive a said block of solid thermoplastic material with one end portion of the block in the melting chamber and the block projecting through said sleeve; means for heating said barrel member to melt the end portion of the block therein; and a feeding mechanism at the end of said sleeve opposite said melting chamber comprising wall means fixed to said frame and defining a passageway adapted to guide the solid thermoplastic material block in alignment with the through opening in said sleeve, a slide having an upper surface positioned adjacent said passageway, and being mounted on said frame for movement along a path generally aligned with the melting chamber from a retracted position spaced from said sleeve to an advanced position more closely adjacent the sleeve and back to said retracted position, drive means carried by said slide adapted for engaging said cylindrical portions and advancing the block of thermoplastic material toward the melting chamber during movement of said slide from its retracted to its advanced position, and for moving around the cylindrical portions and along the block of thermoplastic during movement of said slide from its advanced to its retracted position, means for aligning the block of thermoplastic in said passageway for engagement by said drive means, and means projecting from the side of said slide opposite said upper surface in a direction generally at a right angle to said upper surface including a first projecting part adjacent said sleeve and a second projecting part spaced from the side of said first projecting part opposite said sleeve for defining a recess between said first and second parts adapted to receive the end portion of the thumb of an operator gripping said handle to afford manual movement of said slide both toward said advanced position and toward said retracted position.

7. A device according to claim 6 wherein said means for aligning comprises a sprocket having teeth spaced to engage between said cylindrical portions along corresponding sides of said rectangular portions, said sprocket being mounted on said wall means on the side of said passageway opposite said drive means for rotation about an axis disposed transverse of said passageway.

8. A device according to claim 6 wherein said drive means comprises an elongate drive member having a plurality of teeth adapted to engage between the cylindrical portions of the block, said teeth projecting from one side of said drive member adjacent a first end of said drive member, said drive member being oriented on said slide with its longitudinal direction generally parallel to said passageway and said teeth adjacent said sleeve and having a second end opposite said first end mounted on said slide both for pivotal movement of said drive member relative to said slide between an engage position with said teeth in engagement between cylindrical portions of a said block in said passageway and a release position with the teeth spaced from the block in the passageway, and for longitudinal movement relative to said slide between a normal position and a locked position with said teeth farther from said sleeve with respect to the same position of said slide when said drive member is in said normal position; means adapted for engagement between said slide and said drive member to prevent pivotal movement of said drive member away from said engage position when said drive member is in said locked position and to afford movement of said drive member from said engage position to said release position when said drive member is in said normal position, and a spring between said slide and said drive member for biasing said drive member to said normal and engage positions, said drive member having a projection projecting into said recess and manually engageable to pivot said drive member to said release position when said slide is manually moved toward said retracted position.

9. A device according to claim 8 wherein said teeth have cam surfaces on their sides opposite said sleeve adapted to cam said teeth around the cylindrical portions of a said block by pivoting said drive member toward said release position when said slide is manually moved from said advanced position toward said retracted position.

10. A feeding mechanism adapted for use on a device for dispensing molten, thermoplastic material from a block of the solid thermoplastic material comprising coaxial generally cylindrical portions of uniform predetermined axial and diametrical dimensions uniformly axially spaced along the block by rectangular portions having diagonal dimensions about equal to said diametrical dimension, said device comprising a frame including a handle positioned so that an operator can grip the handle with the fingers of one hand; a barrel member mounted on said frame and having an internal melting chamber communicating with an outlet opening through a nozzle; a sleeve with a through opening having one end secured to said barrel member with said through opening communicating with the end of said melting chamber opposite said outlet opening, said sleeve being adapted to receive the block of solid thermoplastic material with one end portion of the block in the melting chamber and the block projecting through said sleeve; and means for heating said barrel member to melt the end portion of the block therein; said feeding mechanism comprising wall means adapted to be attached to said frame at the end of said sleeve opposite said melting chamber and defining a passageway adapted to guide the solid thermoplastic material block in alignment with the through opening in said sleeve; a slide having an upper surface adapted to support the block and being mounted on said frame for movement along a path generally aligned with the melting chamber from a retracted position spaced from said sleeve to an advanced position more closely adjacent the sleeve and back to said retracted position; drive means carried by said slide adapted for engaging said cylindrical portions and advancing the block of thermoplastic material toward the melting chamber during movement of said slide from its retracted to its advanced position, and for moving around the cylindrical portion and along the block of thermoplastic during movement of said slide from its advanced to its retracted position; means for aligning the block of thermoplastic in said passageway for engagement by said drive means; and means projecting from the side of said slide opposite said upper surface in a direction generally at a right angle to said upper surface including a first projecting part adjacent said sleeve and a second projecting part spaced from the side of said first projecting part opposite said sleeve for defining a recess between said first and second parts adapted to receive the end portion of the thumb of an operator gripping said handle to afford manual movement of said slide both toward said advanced position and toward said retracted position.

11. A feeding mechanism according to claim 10 wherein said means for aligning comprises a sprocket having teeth spaced to engage between said cylindrical portions along corresponding sides of said rectangular portions, said sprocket being mounted on said wall means on the side of said passageway opposite said drive means for rotation about an axis dispsoed transverse of said passageway.

12. A feed mechanism according to claim 10 wherein said drive means comprises an elongate drive member having a plurality of teeth adapted to engage between the cylindrical portions of the block, said teeth projecting from one side of said drive member adjacent a first end of said drive member, said drive member being oriented on said slide with its longitudinal direction generally parallel to said passageway and said teeth adjacent a said sleeve and having a second end opposite said first end mounted on said slide both for pivotal movement of said drive member relative to said slide between an engage position with said teeth in engagement between cylindrical portions of a said block in said passageway and a release position with the teeth spaced from the block in the passageway, and for longitudinal movement relative to said slide between a normal position and a locked position with said teeth farther from the sleeve with respect to the same position of said slide when said drive member is in said normal position; means adapted for engagement between said slide and said drive member to prevent pivotal movement of said drive member away from said engage position when said drive member is in said locked position and to afford movement of said drive member from said engage position to said release position when said drive member is in said normal position, and a spring between said slide and said drive member for biasing said drive member to said engage and normal positions, said drive member having a projection projecting into said recess and manually engageable to pivot said drive member to said release position when said slide is manually moved toward said retracted position.

13. A feed mechanism according to claim 12 wherein said teeth have cam surfaces on their sides opposite the sleeve adapted to cam said teeth around the cylindrical portions of a said block by pivoting said drive member toward said release position when said slide is manually moved from said advanced position toward said retracted position.

* * * * *